(No Model.)
J. S. DANIELL.
COTTON PLANTER.
No. 323,642. Patented Aug. 4, 1885.
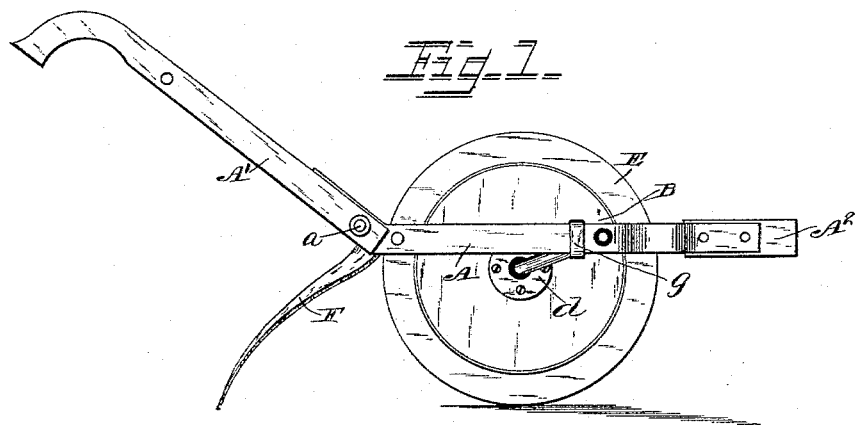
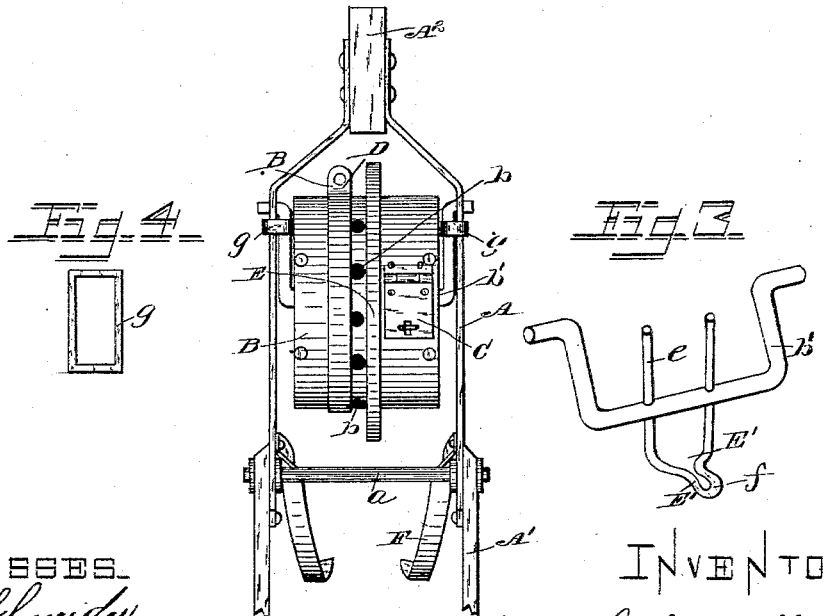
WITNESSES
H. J. Schneider.
Thos. McGill.
INVENTOR
John S. Daniell
By Myers &Co
ATTORNEYS.

UNITED STATES PATENT OFFICE.

JOHN S. DANIELL, OF CONYERS, GEORGIA.

COTTON-PLANTER.

SPECIFICATION forming part of Letters Patent No. 323,642, dated August 4, 1885.

Application filed May 8, 1885. (No model.)

*To all whom it may concern:*

Be it known that I, JOHN S. DANIELL, a citizen of the United States of America, residing at Conyers, in the county of Rockdale and State of Georgia, have invented certain new and useful Improvements in Cotton-Planters, of which the following is a specification, reference being had therein to the accompanying drawings.

My invention relates to an improvement in cotton-planters; and it consists in the peculiar construction, combination, and arrangement of the parts, substantially as hereinafter more fully described and claimed.

In the accompanying drawings, Figure 1 is a side elevation of my cotton-planter. Fig. 2 is a plan view, and Figs. 3 and 4 are detail views thereof.

In the embodiment of my invention I secure to the drum-frame A the handles A' and the clevis A², the drum-frame being formed of strips of sheet-metal turned up edgewise, its forward ends being rigidly secured to the clevis and its rearward ends projected up at an angle to conform to that of the plow-handles, to which they are secured, and where it is also perforated for reception of the transverse bar *a* of the handles A'. The drum B is provided with the door C for admission of seed, and it is secured to the drum and fastened in any ordinary manner, the seed having its outlet through the orifices *b*. The adjustable band D, which incircles the periphery of drum B, is disposed on one side of a central rim, E, and its ends are turned up at B' and provided with a nutted screw projected through orifices therein for tightening the band upon the drum. The rim E is projected out centrally and at right angles to the periphery of the drum a suitable distance therefrom, and it is designed to hold the drum as against contact with the plane of the field during the planting operation, and thus to admit egress of the seed and prevent compression of the seed-hills or furrows, the seed being properly covered over by the coverers F following the seed-drum B. The drum B has its bearings on the axle *b'*, which is passed through a corresponding orifice provided in its center, either end of said axle being at either side of the drum bent and projected at right angles to its central part, and near each end thereof bent outwardly at right angles and projected through the drum-frame A. The drum is also provided with a washer, *d*, on either side or face thereof, through which axle *b'* projects, the washers being designed to prevent the wear of the drum by friction where penetrated by its axle, which is important in view of the fact that the walls of the drum may be made of wood or other light material. Its periphery is preferably made of sheet metal.

In order to facilitate egress of the seed from the drum during the seed-planting process while preventing waste of seed by excessive outflow thereof from too greatly enlarged seed orifices, I provide a seed ejector or agitator, E, which consists of a rod, *e*, having each of its ends passed through coincident vertical orifices provided in the axle *b'*, each end of the rod fitting loosely therein, and said rod is bent in the middle to form the slightly turned up and flattened prong or projection *f*, which is disposed just over the drum-orifices for causing outflow of the seed.

The links *g*, each of which in practice is slipped over the drum-frame A and an arm of axle *b'*, as clearly shown in Fig. 1, are designed for holding the drum and frame in position in moving from place to place, and may be used for adjusting the position and altitude of the frame and handles with relation to the drum.

Thus constructed, the band D may be readily tightened on the periphery of the drum, and caused to cover all or such part of its seed-orifices as may be found most advantageous in connection with the work.

The band D, in connection with the seed-ejector E', which acts as an auxiliary force for ejection of the seed, greatly economizes the seed ordinarily wasted, and also renders the planting more efficient in operation and productive in result.

It will be observed that by providing the angular axle with the links, and at whatever point of adjustment the same may be applied, the wheel or drum will pass over rocks, clods, roots, or like obstructions without throwing the coverers out of the ground.

Having thus fully described my invention, what I claim, and desire to secure by Letters Patent, is—

1. In a cotton-planter, the rolling hopper having centrally-projecting rim journaled on an angular axle carrying a depending agitator pivoted in the side bars of the frame, in combination with the links $g$ for clamping the axle to the side bars, substantially as set forth and shown.

2. In a cotton-planter, the links $g$, connected to the side bars, in combination with the angular axle carrying a depending agitator, and the rolling hopper having centrally-projecting rim, substantially as shown and described.

In testimony whereof I affix my signature in presence of two witnesses.

JOHN S. DANIELL.

Witnesses:
J. W. JONES,
A. M. HELMS.